(12) United States Patent
Badrawy et al.

(10) Patent No.: US 11,745,305 B2
(45) Date of Patent: Sep. 5, 2023

(54) SYSTEM AND METHOD FOR CORRECTING MACHINING ERROR DURING A PRECISION JIG GRINDING PROCESS

(71) Applicant: Moore Nanotechnology Systems, LLC, Swanzey, NH (US)

(72) Inventors: Sinan J. Badrawy, Peterborough, NH (US); Christopher J. Morgan, Keene, NH (US); Mark A. Rubeo, Swanzey, NH (US); Yommie R. Davis, Stratford, CT (US); Ralph E. Murray, Swanzey, NH (US); Jeffrey A. Lowe, Springfield, VT (US)

(73) Assignee: Moore Nanotechnology Systems, LLC, Swanzey, NH (US)

( * ) Notice: Subject to any disclaimer, the term of this patent is extended or adjusted under 35 U.S.C. 154(b) by 208 days.

(21) Appl. No.: 16/908,060

(22) Filed: Jun. 22, 2020

(65) Prior Publication Data

US 2021/0001446 A1 Jan. 7, 2021

Related U.S. Application Data

(60) Provisional application No. 62/870,950, filed on Jul. 5, 2019.

(51) Int. Cl.
*G05B 19/4068* (2006.01)
*B24B 49/04* (2006.01)
(Continued)

(52) U.S. Cl.
CPC ............ *B24B 49/04* (2013.01); *B23Q 1/4809* (2013.01); *B23Q 15/12* (2013.01); *G05B 19/4068* (2013.01)

(58) Field of Classification Search
CPC .... G05B 19/41875; G05B 2219/32077; G05B 2219/32194; G05B 2219/32201;
(Continued)

(56) References Cited

U.S. PATENT DOCUMENTS 1,835,822 A 12/1931 Stutzenstein
4,899,628 A * 2/1990 Seichter ............... B23Q 1/4804
82/131

(Continued)

FOREIGN PATENT DOCUMENTS

| EP | 0545655 A2 | 6/1993 |
| EP | 2818949 | 12/2014 |
| WO | 2005023486 | 3/2005 |

OTHER PUBLICATIONS

International Search Report and Written Opinion for Application No. PCT/US2020/038949 dated Sep. 4, 2020.

(Continued)

*Primary Examiner* — Yuhui R Pan
(74) *Attorney, Agent, or Firm* — Dority & Manning, P.A.

(57) ABSTRACT

According to one example, a CNC machine tool system may perform error compensation for improving the accuracy of the geometry (or form) of a machined workpiece to, for example, better than 2 micrometers. To do so, a first machined workpiece may be created using the CNC machine tool system. The CNC machine tool system may create the machined workpiece by jig grinding. Following the creation of the first machined workpiece, metrology of the workpiece error may then be performed on the machined workpiece. The metrology of the workpiece error may be used to create a corrected toolpath trajectory for re-machining. This corrected toolpath trajectory may then be utilized by the CNC machine tool system to machine a second (Continued)

machined workpiece having a geometry (or form) with an accuracy of, for example, better than 2 micrometers.

36 Claims, 5 Drawing Sheets

(51) Int. Cl.
 *B23Q 15/12* (2006.01)
 *B23Q 1/48* (2006.01)
(58) Field of Classification Search
 CPC ........... G05B 2219/33034; G05B 2219/34477; Y02P 90/02
 See application file for complete search history.

(56) References Cited

U.S. PATENT DOCUMENTS

| | | | |
|---|---|---|---|
| 5,005,135 | A | 4/1991 | Morser et al. |
| 5,025,592 | A | 6/1991 | Yamamori et al. |
| 5,662,568 | A | 9/1997 | Lindem |
| 6,167,325 | A | 12/2000 | Kamiguchi et al. |
| 9,448,553 | B2 | 9/2016 | De Schepper |
| 9,645,217 | B2 | 5/2017 | Morfino et al. |
| 2005/0177270 | A1* | 8/2005 | Stacklies ................ B24B 13/06 700/164 |
| 2006/0253220 | A1 | 11/2006 | McPherson et al. |
| 2007/0091094 | A1* | 4/2007 | Hong ................ G05B 19/4103 345/474 |
| 2008/0012520 | A1 | 1/2008 | Matsumoto et al. |
| 2009/0280721 | A1 | 11/2009 | Hoon |
| 2012/0295516 | A1 | 11/2012 | Guo et al. |
| 2016/0054722 | A1 | 2/2016 | Jalluri et al. |
| 2016/0146589 | A1* | 5/2016 | Jonas ................... G01B 21/045 33/503 |
| 2016/0202691 | A1 | 7/2016 | Pettersson et al. |
| 2018/0299859 | A1* | 10/2018 | Kaneko ................. G05B 19/402 |
| 2018/0307197 | A1* | 10/2018 | Masumiya ............. G05B 19/19 |

OTHER PUBLICATIONS

W. Goa et al. "On-machine and in-process surface metrology for precision manufacturing" CIRP Annals Elsevier BV, NL, CH, FR vol. 68, No. 2 Jan. 2, 2019 (Jan. 2, 2019) pp. 843-866 XP085776511 ISSN: 0007-8506 DOI: 10.1016/J.CIRP.2019-05-005.
European Search Report issued in Application No. EP 20836433.1 dated Jul. 13, 2023 (17 pages).

* cited by examiner

SYSTEM AND METHOD FOR CORRECTING MACHINING ERROR DURING A PRECISION JIG GRINDING PROCESS

CROSS-REFERENCE TO RELATED APPLICATIONS

This application claims priority to U.S. Provisional Patent Application No. 62/870,950 filed Jul. 5, 2019, the entirety of which is incorporated herein by reference.

TECHNICAL FIELD

This invention relates generally to material removal processes for machining a workpiece, and more particularly to error compensation in a Computer Numerical Controller (CNC) machine tool system, such as error compensation for correcting machining errors during an ultra-precision jig grinding process.

BACKGROUND

Traditionally, material removal processes (such as jig grinding) have been used to generate precision features in a workpiece. For example, jig grinding operations may generate holes and contours with sub-micron form accuracy. These traditional material removal processes, however, may be deficient.

SUMMARY

According to one example, a Computer Numerical Controller (CNC) machine tool system may perform error compensation for improving the accuracy of the geometry (e.g., otherwise referred to as form) of a machined workpiece to, for example, better than 2 micrometers. To do so, a first machined workpiece may be created using the CNC machine tool system. The CNC machine tool system may create the machined workpiece by jig grinding, or by utilizing any other method that utilizes at least one cutting edge of a rotary tool for cutting a workpiece. Following the creation of the first machined workpiece, metrology of the workpiece error may then be performed on the machined workpiece (e.g., where metrology is performed while the machined workpiece is still on the CNC machine tool system, or after the machined workpiece is removed from the CNC machine tool system). The metrology of the workpiece error may be used to create a corrected toolpath trajectory for re-machining. This corrected toolpath trajectory may then be utilized by the CNC machine tool system to machine a second machined workpiece having a geometry with an accuracy of, for example, better than 2 micrometers.

According to another example, a CNC machine tool system may have the ability to grind and/or remove material with an improved workpiece error and accuracy better than, for example, 2 micrometers. For example, the CNC machine may utilize an error compensation method for improving the accuracy of a machined workpiece through the means of jig grinding or any other method provided for use with at least one cutting edge of a rotary tool for a workpiece to better than, for example, 2 microns in geometry error. As an example of this, geometry (e.g., otherwise referred to as form) error of a feature of a machined workpiece may be quantified, and then these quantified errors may be used to establish a corrected toolpath trajectory such that the feature can be re-machined with geometry errors less than, for example, 2 micrometers.

According to a further example, a method includes removing, using a CNC machine tool and further using a toolpath trajectory, material from a workpiece to create a first machined workpiece. The CNC machine tool includes two or more linear machine axes, or two or more linear machine axes and one or more rotational machine axes, and further includes a spindle configured to hold a rotary tool having at least one cutting edge for removing the material from the workpiece. The method further includes measuring the first machined workpiece for geometric accuracy in comparison to a desired geometry to determine one or more errors, mirroring the one or more errors with respect to the desired geometry to create a correction point template, utilizing the correction point template to create a corrected toolpath trajectory, and removing, using the CNC machine tool and further using the corrected toolpath trajectory, material from the first machined workpiece or a second workpiece to create a second machined workpiece with an improved geometry accuracy of better than 2 micrometers in comparison to the desired geometry.

In such an example, the rotary tool may be a grinding wheel, a milling tool, or a boring tool. The corrected toolpath trajectory may be created by an internal computer of the CNC machine tool, or the corrected toolpath trajectory may be created by a computer that is external from the CNC machine tool. The corrected toolpath trajectory may be created in a machine code format that is compatible with a processor of the CNC machine tool. The corrected toolpath trajectory may be created by modifying linear and/or rotational axis servo commands during a servo cycle.

The first machined workpiece may be measured for geometric accuracy by a metrology device while the first machined workpiece is positioned on the same CNC machine tool that removed the material. The metrology device may be a mechanical contacting probe, a non-contacting scanner, or a non-contacting probe.

The first machined workpiece may be measured for geometric accuracy on a metrology device that is independent of the CNC machine tool. The metrology device may be a coordinate measuring machine, a roundness gauge, a cylindricity gauge, or a bore gauge.

According to another example, a method includes removing, using a CNC machine tool and further using a toolpath trajectory, material from a workpiece to create a first machined workpiece. The CNC machine tool includes two or more linear machine axes, or two or more linear machine axes and one or more rotational machine axes, and further includes a spindle configured to hold a rotary tool having at least one cutting edge for removing the material from the workpiece. The toolpath trajectory is configured to cause at least one of the linear axes to reciprocate while the other axes are utilized to traverse a contour on the workpiece. The method further includes measuring the first machined workpiece for geometric accuracy in comparison to a desired geometry to determine one or more errors, mirroring the one or more errors with respect to the desired geometry to create a correction point template, utilizing the correction point template to create a corrected toolpath trajectory, and removing, using the CNC machine tool and further using the corrected toolpath trajectory, material from the first machined workpiece or a second workpiece to create a second machined workpiece with an improved geometry accuracy in comparison to the desired geometry.

According to a further example, a system includes a CNC machine tool. The CNC machine tool includes two or more linear machine axes, or two or more linear machine axes and one or more rotational machine axes, and further includes a spindle configured to hold a rotary tool having at least one cutting edge for removing material from a workpiece. The system further includes one or more processors configured, upon execution, to: utilize a toolpath trajectory to cause the CNC machine tool to remove material from the workpiece to create a first machined workpiece, receive a correction point template representing one or more errors in the first machined workpiece in comparison to a desired geometry, utilize the correction point template to create a corrected toolpath trajectory, and utilize the corrected toolpath trajectory to cause the CNC machine tool to remove material from the workpiece or a second workpiece to create a second machined workpiece with an improved geometry accuracy of better than 2 micrometers in comparison to the desired geometry.

The system may further include a metrology device configured to measure the first machined workpiece for geometric accuracy in comparison to a desired geometry to determine the one or more errors to create the correction point template. The metrology device may be connected to the CNC machine tool such that the first machined workpiece can be exchanged between the CNC machine tool and the metrology device by automation.

According to another example, a system includes a CNC machine tool. The CNC machine tool includes two or more linear machine axes, or two or more linear machine axes and one or more rotational machine axes, and further includes a spindle configured to hold a rotary tool having at least one cutting edge for removing material from a workpiece. The CNC machine tool is configured to reciprocate at least one of the linear machine axes while the other axes are utilized to traverse a contour on the workpiece. The system further includes one or more processors configured, upon execution, to: utilize a toolpath trajectory to cause the CNC machine tool to remove material from the workpiece to create a first machined workpiece, receive a correction point template representing one or more errors in the first machined workpiece in comparison to a desired geometry, utilize the correction point template to create a corrected toolpath trajectory, and utilize the corrected toolpath trajectory to cause the CNC machine tool to remove material from the workpiece or a second workpiece to create a second machined workpiece with an improved geometry accuracy of better than 2 micrometers in comparison to the desired geometry.

According to a further example, a system includes a CNC machine tool. The CNC machine tool includes two or more linear machine axes, or two or more linear machine axes and one or more rotational machine axes, and further includes a spindle configured to hold a rotary tool having at least one cutting edge for removing material from a workpiece. The CNC machine tool is configured to reciprocate two parallel linear machine axes of the two or more linear machine axes while the other axes are utilized to traverse a contour on the workpiece. The motion of the two parallel linear machine axes are synchronized to minimize the resulting force on a machine structure of the CNC machine tool.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Embodiments of the present disclosure are best understood by referring to FIGS. 1-5 of the drawings, like numerals being used for like and corresponding parts of the various drawings.

FIGS. 1-5 illustrate a Computer Numerical Controller (CNC) machine tool system that may be able to perform error compensation in its material removal process. For example, the CNC machine tool system may be able to perform error compensation that may compensate for (e.g., correct) workpiece error sources that derive from systematic errors (e.g., synchronous spindle error motions, tool geometry, process loads, structural machine compliances, temperature errors, etc.). Such systematic errors are process and/or machine-based errors, and are consistent under constant conditions. The error compensation performed by the CNC machine tool system may compensate for any number of systematic errors, including all systematic errors, in some examples. Additionally, the error compensation performed by the CNC machine tool system may compensate for systematic errors, regardless of whether those systematic errors originate from the machine (itself), or the machining process. That is, the error compensation performed by the CNC machine tool system may take into account both systematic process error sources and systematic machine error sources (e.g., simultaneously), thereby creating a more accurate machined workpiece. The error compensation performed by the CNC machine tool system may improve the accuracy of the geometry of a machined workpiece to, for example, better than 2 micrometers. That is, features of the machined workpiece may be machined with geometry error of, for example, less than 2 micrometers, in some examples. In such an example, the peak-to-valley error (as opposed to the total error) in the geometry of the machined workpiece may be less than 2 micrometers from the desired geometry.

Figure 1:
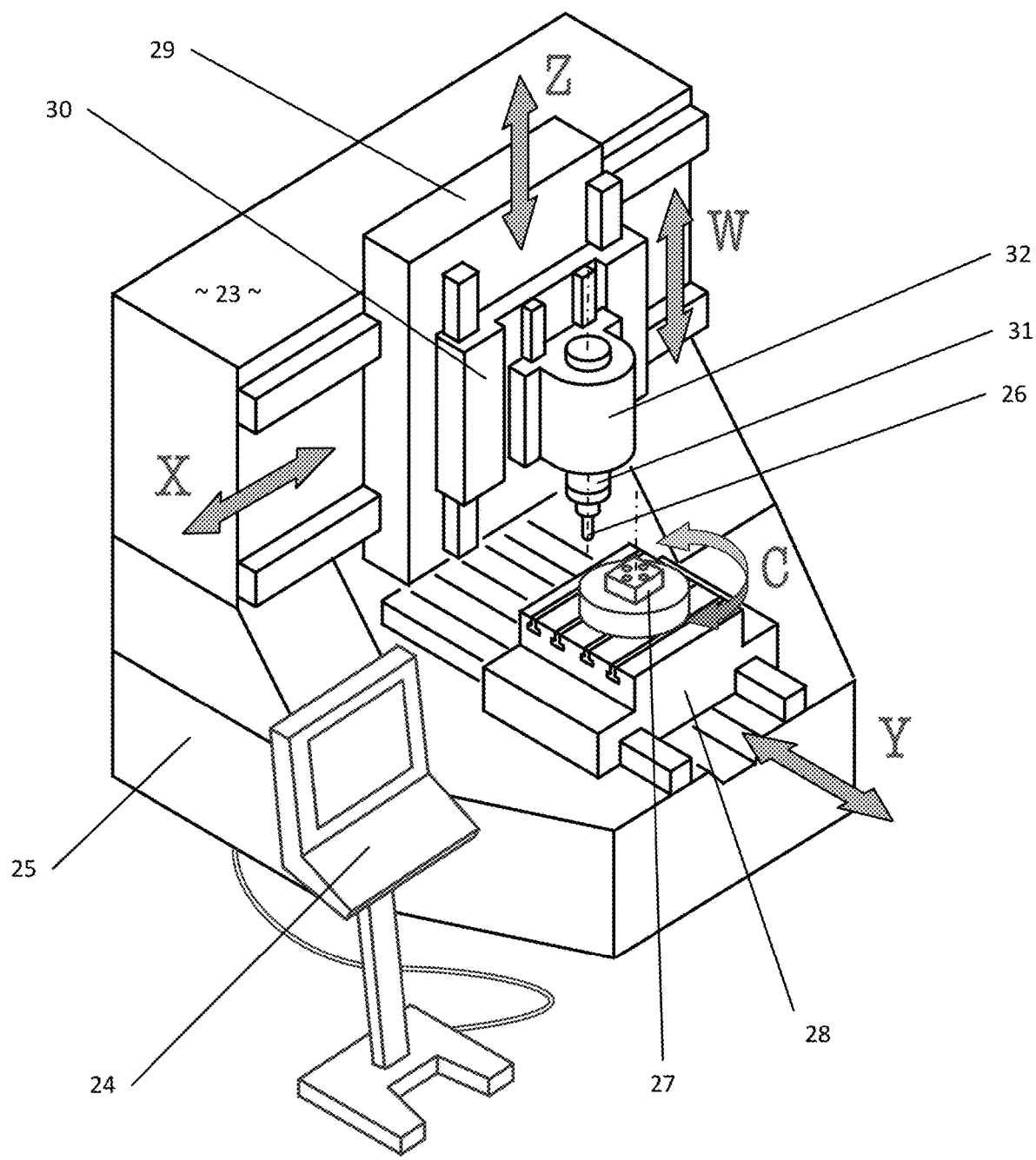
FIG. 1 illustrates a perspective view of an example CNC machine tool system.

FIG. 1 illustrates a perspective view of an example CNC machine tool system. The CNC machine tool system 23 may be any motorized maneuverable tool (and motorized maneuverable platform, in some examples) which may be controlled by a computer core in accordance with specific instructions (e.g., such as controlled by Computer Numerical Control), As is illustrated, the CNC machine tool system 23 is a CNC jig grinder, such as, for example, a precision jig grinder (e.g., M400 manufactured by Moore Nanotechnology Systems, LLC). As another example, the CNC machine tool system 23 may be a three axis milling machine, four axis milling machine, or a five axis milling machine. In other examples, the CNC machine tool system 23 may be any other motorized (e.g., servo driven) maneuverable tool (and motorized maneuverable platform, in some examples) where relative movement along a linear, curved, or circular path can be effected by coordinated linear movement or a coordinated rotational and linear movement along two or three axes. For example, the CNC machine tool system 23 may be any machine upon which a tool 26 may be mounted for material removal.

As is illustrated, the CNC machine tool system 23 includes a Computer Numerical Control (CNC) 24, and a jig grinding machine 25. The CNC 24 may control the actions of the jig grinding machine 25. The CNC 24 may include one or more processors for controlling the actions of the jig grinding machine 25. The jig grinding machine 25 may perform the actions controlled by the CNC 24 in order to create a machined workpiece.

To control the jig grinding machine 25, the CNC 24 may receive manufacturing instructions. These instructions may be received in any form. For example, the instructions may be in the form of a computer-aided design (CAD) file, a computer-aided manufacturing (CAM) file, a Numerical Control (NC) file, NC files that are derived from CAD or CAM files, an interactive conversation between machine operator and the CNC 24, macro files, any other form, or any combination of the preceding. The instructions may tell the CNC 24 how to create a machined workpiece. For example, the instructions may be a blueprint utilized by the CNC 24 to create a machined workpiece that has a 10 mm diameter circular hole at a particular location in the workpiece.

Following reception of the instructions, the CNC 24 may translate these instructions into commands for the jig grinding machine 25. These commands may be used by the CNC machine tool system 23 to control the operation of the jig grinding machine 25. For example, the commands may control the motors (e.g., servomotors) of the jig grinding machine 25, causing relative motion between a tool 26 affixed to the jig grinding machine 25 and a workpiece 27 being worked on by the jig grinding machine 25. An example of the commands may include G-code (also referred to as RS-274).

The jig grinding machine 25 may be a machine tool used for grinding complex shapes and/or holes in a workpiece 27. The jig grinding machine 25 includes a tool 26 used to grind one or more of the complex shapes and holes in the workpiece 27. The tool 26 may be a rotary tool having at least one cutting edge. This rotary tool may not rotate itself. Instead, it may be rotated by a bidirectional rotatable spindle (e.g., the bidirectional rotatable spindle 31 discussed herein). Examples of the tool 26 include cylindrical grinding wheel(s), segmented grinding wheel(s), or any other mounted point wheel type(s). Other examples of the tool 26 include milling tool(s) with one or more cutting edges and boring tool(s) with a single cutting edge.

The workpiece 27 may be any material that may be machined by a material removal process, such as, for example, glass, metal, plastic, any other material that may be machined by a material removal process, or any combination of the preceding.

In order to create the machined workpiece out of the workpiece 27, the jig grinding machine 25 may have various machine members that may move along various axes. For example, the jig grinding machine 25 may include a workpiece support slide assembly 28 upon which the workpiece 27 may be positioned. This workpiece support slide assembly 28 may be configured for bidirectional linear movement along the Y-Axis (as illustrated). As another example, the jig grinding machine 25 may include a cross axis slide assembly 29 that may be configured for bidirectional linear movement along the X-Axis (as illustrated), which is arranged orthogonally to the Y and Z Axes. As a further example, the jig grinding machine 25 may include a spindle slide assembly 30 that is supported on the cross axis slide assembly 29. This spindle slide assembly 30 may be configured for bidirectional linear movement along the Z-Axis (as illustrated). These assemblies 28, 29, and 30 may allow the jig grinding machine 25 to carry out motion (per commands from the CNC 24) between the tool 26 and the workpiece 27 in X, Y, and Z axes. For example, they may allow the jig grinding machine 25 to carry out motion (per commands from the CNC 24) between the tool 26 and the workpiece 27 along a programmed toolpath trajectory in the X, Y, and Z axes.

In other examples, the jig grinding machine 25 may have one or more machine members that may move along a rotational axis or axes. These rotational axes may be in addition to (or an alternative) to one or more (or all of the) linear axes discussed above. For example, the jig grinding machine 25 may include a rotary workpiece support axis (illustrated as the C-Axis) which may be mounted on the workpiece support slide assembly 28, and that may rotate along the C-Axis (in a motion parallel to the Z-Axis). The rotary workpiece support axis may allow the jig grinding machine 25 to carry out motion between the tool and the workpiece along a programmed toolpath trajectory in the X, Y, Z, and C axes. An example of a jig grinding machine 25 that includes linear axes and rotational axes is the M400 manufactured by Moore Nanotechnology Systems, LLC.

As a further example, the jig grinding machine 25 may include a bidirectional rotatable spindle 31 positioned on the spindle slide assembly 30. The tool 26 may be mounted on the bidirectional rotatable spindle 31. The jig-grinding machine 25 may be also includes other axes of movement. For example, in addition to the linear X, Y, and Z axes, jig-grinding machine 25 may also include a bidirectional W-Axis which is associated with reciprocating member 32 configured to carry out a reciprocating motion (discussed below). In some examples, when machining a workpiece 27, the reciprocating member 32 may allow the jig-grinding machine 25 to reciprocate along at least one linear axis (e.g., the Z-Axis), while one or more other axes of the jig-grinding machine 25 traverse a contour on the workpiece 27. As is illustrated, the Z-Axis and W-Axis are oriented parallel such that the combined motion results in displacement along the parallel direction. In some examples, when machining a workpiece 27, the reciprocating member 32 may allow the jig-grinding machine 25 to reciprocate along at least these two parallel axes (e.g., the Z-Axis and W-Axis), while one or more other axes of the jig-grinding machine 25 traverse a contour on the workpiece 27. The Z-Axis and W-Axis may be configured so that the combination of their motions achieve the desired position of the tool 26, as well as minimize the resulting force on the cross slide. For instance, the ratio of mass of the W and Z slides may be utilized to describe motion such that the accelerations of those axes cause counter-acting forces which, when summed, cancel out the resulting force. In such an example, the mass of the Z slide multiplied by acceleration may be equal to the mass of the W slide multiplied by acceleration, at all points of travel.

The jig grinding machine 25 described above is one example of a machine configuration. The jig grinding machine 25 of the CNC machine tool system 23, however, is not limited to such a configuration. In other examples, the jig grinding machine 25 may be any other 3-axis machine. For example, the jig grinding machine 25 may include two workpiece support slides assemblies 28 upon which the workpiece 27 may be positioned. These workpiece support slide assemblies 28 may be configured for bidirectional linear movement along the X and Y-Axis. As a further example, the jig grinding machine 25 may include a spindle slide assembly 30 that is supported on the cross axis slide assembly 29 and oriented to the Z-Axis.

Figure 2A:
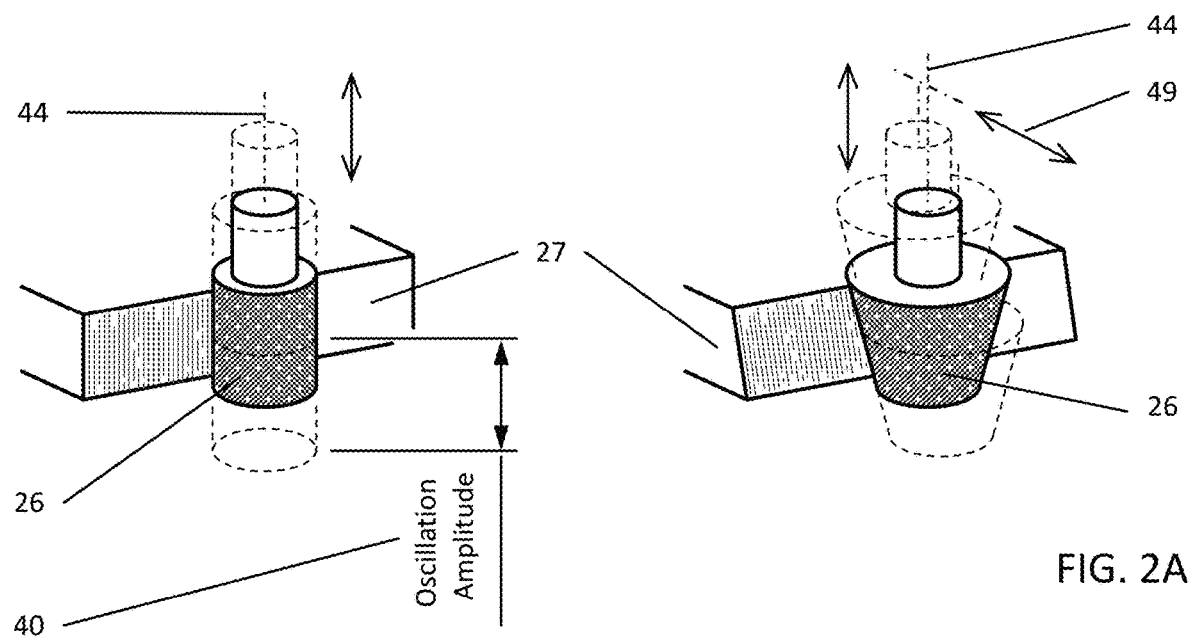
FIGS. 2A-2C illustrate the relative motion paths between a tool and a workpiece that are applied in jig grinding.
Figure 2B:
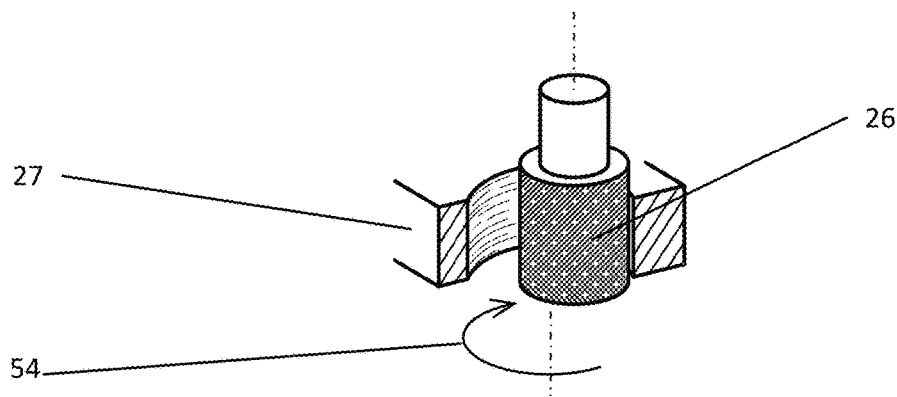
Figure 2C:
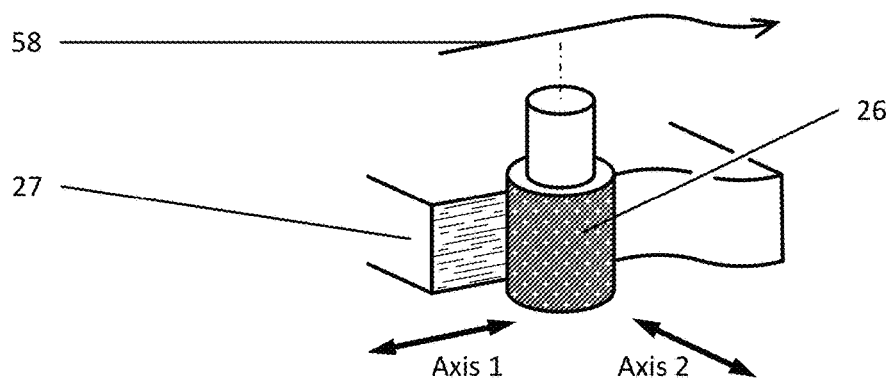

FIGS. 2A-2C illustrate the relative motion paths between the tool 26 and the workpiece 27 that are applied in jig grinding. FIG. 2A illustrates a reciprocal motion path, where the tool 26 (e.g., a grinding wheel) is oscillating (e.g., up and down) at a defined amplitude 40 and at an oscillating rate (strokes/minute). This oscillation may occur along the tool 26's main axis 44 (e.g., up and down) or along the tool 26's main axis 44 and an orthogonal axis 49 simultaneously (e.g., back and forth along the Y-Axis and/or the X-Axis of FIG. 1).

FIG. 2B illustrates a planetary motion, where the tool 26 and/or workpiece 27 are moved in a relative circular motion 54 to each other.

FIG. 2C illustrates an NC-Path motion, where a predefined commanded NC path 58 (e.g., the NC file discussed above) is utilized to create a motion path between the tool 26 and the workpiece 27 along two axes (e.g., along the X-Axis and the Y-Axis of FIG. 1).

To machine a workpiece contour, two or more of these motions may be applied in jig-grinding simultaneously. An example of this is grinding a hole, which is achieved through a simultaneous reciprocal motion (FIG. 2A) and planetary motion (FIG. 2B). The workpiece contour may be defined as a profile or shape which encompasses a specific feature on a workpiece. For instance, a workpiece contour may be a single hole or an entire outline of a workpiece.

Figure 3:
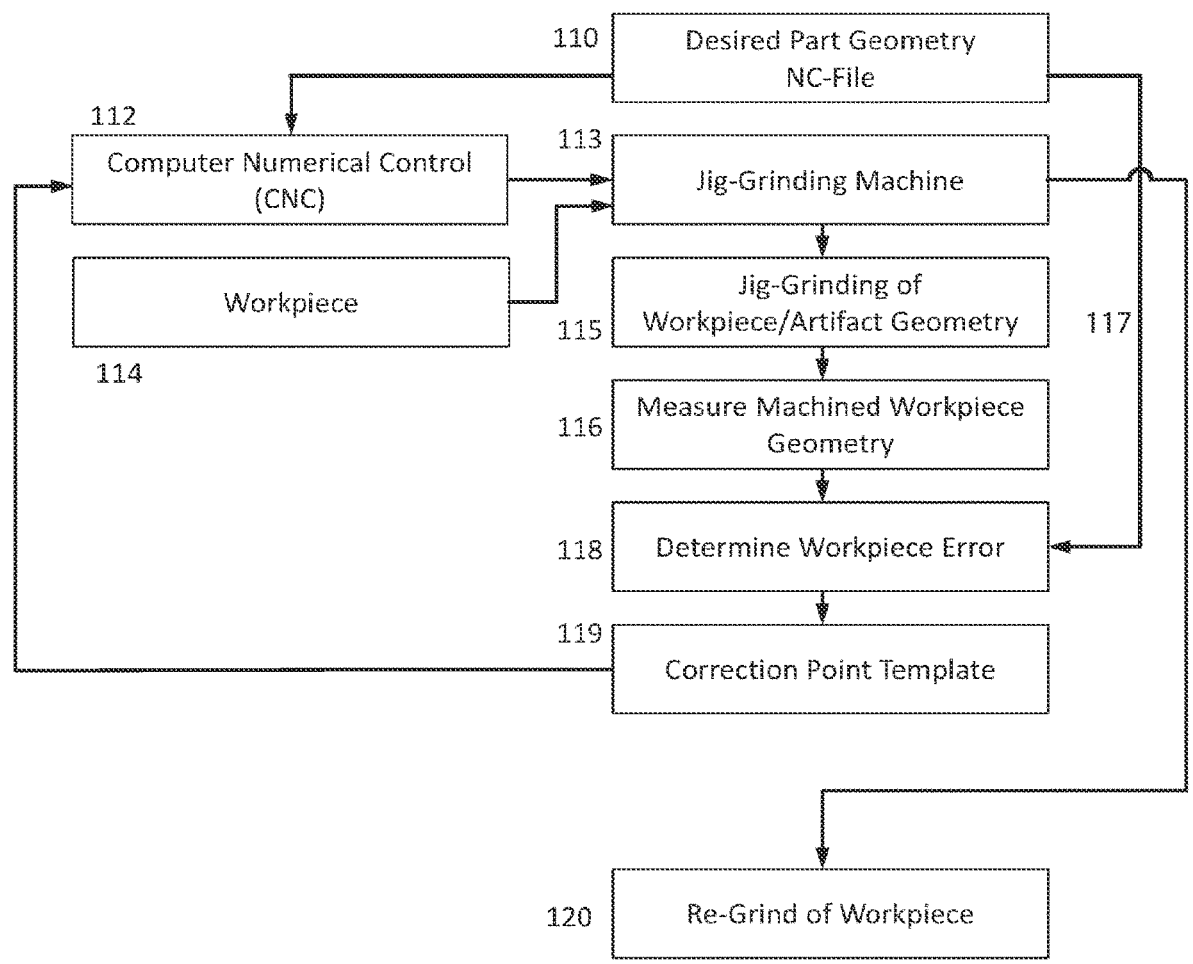
FIG. 3 illustrates an example of the error compensation performed by a CNC machine tool system.

As is discussed above, the CNC machine tool system 23 may be able to perform error compensation during its material removal process. FIG. 3 illustrates an example of the error compensation performed by a CNC machine tool system, such as the CNC machine tool system 23 of FIG. 1 having a CNC 24 and a jig grinding machine 25. One or more steps of the example error compensation method 100 of FIG. 3 may be performed entirely by the CNC machine tool system 23 of FIG. 1, while other steps may be performed by additional devices. In some examples, the entire method 100 may be performed by a CNC machine tool system 23.

Figure 4A:
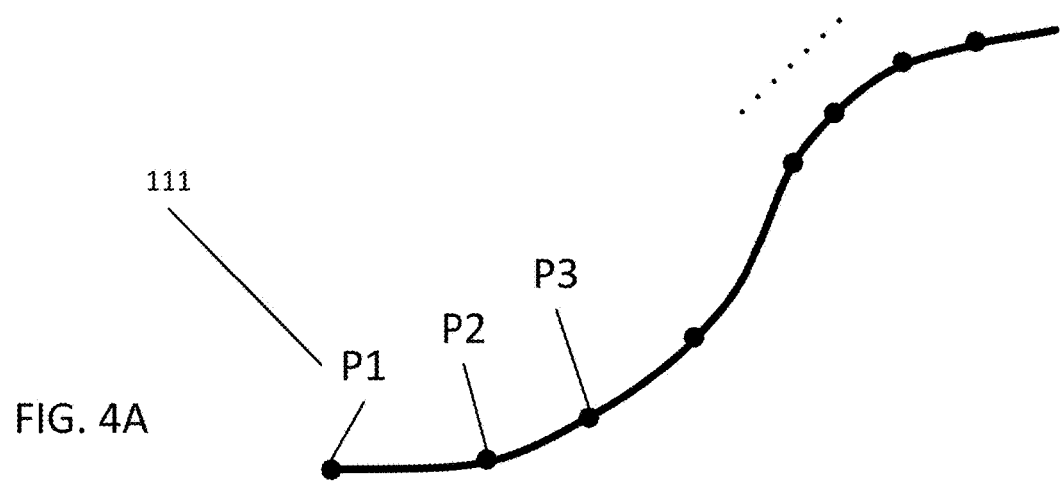
FIG. 4A illustrates examples of commanded positions for a tool of the CNC machine tool system of FIG. 1.

At step 110, instructions for a workpiece 27 are specified. The instructions may describe the commanded positions 111 (P1, P2, P3, . . . ) for a tool 26 of the CNC machine tool system 23 (as is illustrated in FIG. 4A), or a general circular motion path command. The instructions may further include reciprocation rate, reciprocation amplitude, axis feed rate, total number of tool oscillations, any other technological parameter of the CNC machine tool system 23, or any combination of the preceding. The instructions may be derived from a CAD file, derived from a CAM file, an interactive conversation between the machine operator and CNC 24, or in the form of a NC file. As is illustrated, the instructions are in the form of a NC file. The instructions may be specified in any way. For example, the instructions may be created, downloaded, retrieved, manually input, specified in any other manner, or any combination of the preceding.

At step 112, the instructions may be interpreted by the CNC 24 of the CNC machine tool system 23. In order to interpret the instructions, the instructions may be received by the CNC 24 in any manner. For example, the instructions may be transmitted to the CNC 24 (e.g., over a network). In other examples, the instructions may be created on the CNC 24, added to the CNC 24 (e.g., by disk, Universal Serial Bus stick, etc.), downloaded by the CNC 24, received by the CNC 24 in any other manner, or any combination of the preceding.

Following reception of the instructions, the CNC 24 may interpret the instructions. By interpreting the instructions, the CNC 24 may translate these instructions into commands for the jig grinding machine 25. These commands may be used by the CNC machine tool system 23 to control the operation of the jig grinding machine 25. For example, the commands may be commands for each of the axes (e.g., X, Y, Z, W, C) of the jig grinding machine 25 for executing the programmed toolpath trajectory with the defined feed rate. Such commands cause the tool 26 and/or workpiece 27 to be moved along the axes of the jig grinding machine 25. That is, the commands may be (or include) a trajectory motion path calculation of the axes of the jig grinding machine, so as to create the desired workpiece, in some examples.

At step 113, the commands may be transmitted to the jig grinding machine 25. Additionally, at step 114, a workpiece 27 may be positioned on the workpiece support slide assembly 28 of the jig grinding machine 25.

At step 115, the workpiece 27 may be machined by the jig grinding machine 25 utilizing the commands from the CNC 24. This may transform the workpiece 27 into a machined workpiece. In some examples, the geometry of the machined workpiece may have one or more deviations from the desired workpiece geometry due to systematic errors, as is discussed above. For example, the desired workpiece geometry may have included a circular hole in the workpiece 27. In contrast to this, systematic errors associated with the machining of the workpiece 27 may have resulted in a workpiece 27 having an elliptical shaped hole.

To determine these errors, the method 100 may move to step 116, where the geometry of the machined workpiece is measured. The geometry of the machined workpiece may be measured in any manner. As an example, the geometry may be measured using a metrology device. The metrology device may measure the geometry of the workpiece by sensing discrete points on the surface of the workpiece with a probe. The probe may be a mechanical contacting probe, such as a touch probe (e.g., a gauge having a lever and ball) that moves against the contour of the machined workpiece. In other examples, the probe may be a non-contacting probe, such as a non-contact displacement sensor. In such an example, the measurements may be optical, utilizing a sensor and light to measure the geometry of the machined workpiece. The metrology device may also use a scanner rather than a probe. The scanner collects multiple discrete points on the surface simultaneously, rather than collecting a single discrete point. Other examples of a metrology device include a coordinate measuring machine, a roundness gauge, a cylindricity gauge, a bore gauge, or any other device for measuring the geometry of a workpiece. The measured geometry of the machined workpiece may include measurements of the dimensions of the machined workpiece along all three main axes (X, Y, Z).

In some examples, the geometry of the machined workpiece may be measured while the machined workpiece is positioned on the workpiece support slide assembly 28 of the jig grinding machine 25 (e.g., on machine measurements). In other examples, the machined workpiece may be removed from the jig grinding machine 25 before the geometry of the machined workpiece may be measured (e.g., off machine measurements). In some examples, the metrology device and the CNC machine tool system 23 may be connected so as to allow the exchange of the workpiece between the metrology device and the CNC machine tool system 23 by robotic automation. This may allow the error correction process to be fully automated, so that the workpiece may be machined, the workpiece geometry measured, and then the workpiece re-machined without a user needing to touch or move the workpiece in-between these steps. This may, in some examples, allow for an improvement of the accuracy of the machining to better than 2 micrometers.

At steps 117-119, the error of machined workpiece geometry may be determined, and error may be used to create a correction point template 123. The error may be numerically determined or physically determined through discrete or volumetric measurement points of data. The error may be determined using any suitable deterministic or measurement device. For example, the error may be determined using an internal or external computer system (e.g., laptop, desktop, server system). The computer system is defined as internal to the CNC machine tool system 23 when the computer system is connected such that commands may be sent between the CNC machine tool system 23 and the computer system. An example of an internal computer system includes a measurement device (or other computer system) affixed to and communicating with the CNC machine tool system 23. Another example of an internal computer system is when the error is determined by the CNC machine tool system 23 itself (e.g., the error is determined using the CNC 24 of the CNC machine tool system 23). An example of an external computer system may include a measurement device (or other computer system) that does not communicate with the CNC machine tool system 23. In such an example, the errors may be determined by the external computer system, and then the errors may be physically or manually input into the CNC machine tool system 23 (e.g., via a USB drive, a disc drive, or manual entry of the data), or the errors may be determined by the external computer system, and then these errors may be input into (or otherwise communicated to) a third device (e.g., another computer) that communicates with the CNC machine tool system 23. The error may be determined by the metrology device itself (e.g. a coordinate measuring machine or a roundness gauge), in other examples.

At step 117, the desired geometry of the workpiece may be provided for the error determination. The desired geometry of the workpiece may be the NC file, itself. In other examples, the desired geometry may be separate from the NC file. For example, the desired geometry may be separate set of measurements for the desired geometry (e.g., a CAD file for the workpiece, a CAM file for the workpiece, or any other measurements of the desired workpiece). Using a desired geometry that is separate from the NC file may be advantageous because the errors in the machined workpiece may be the result of an inaccurate NC file, in some examples.

Figure 4B:
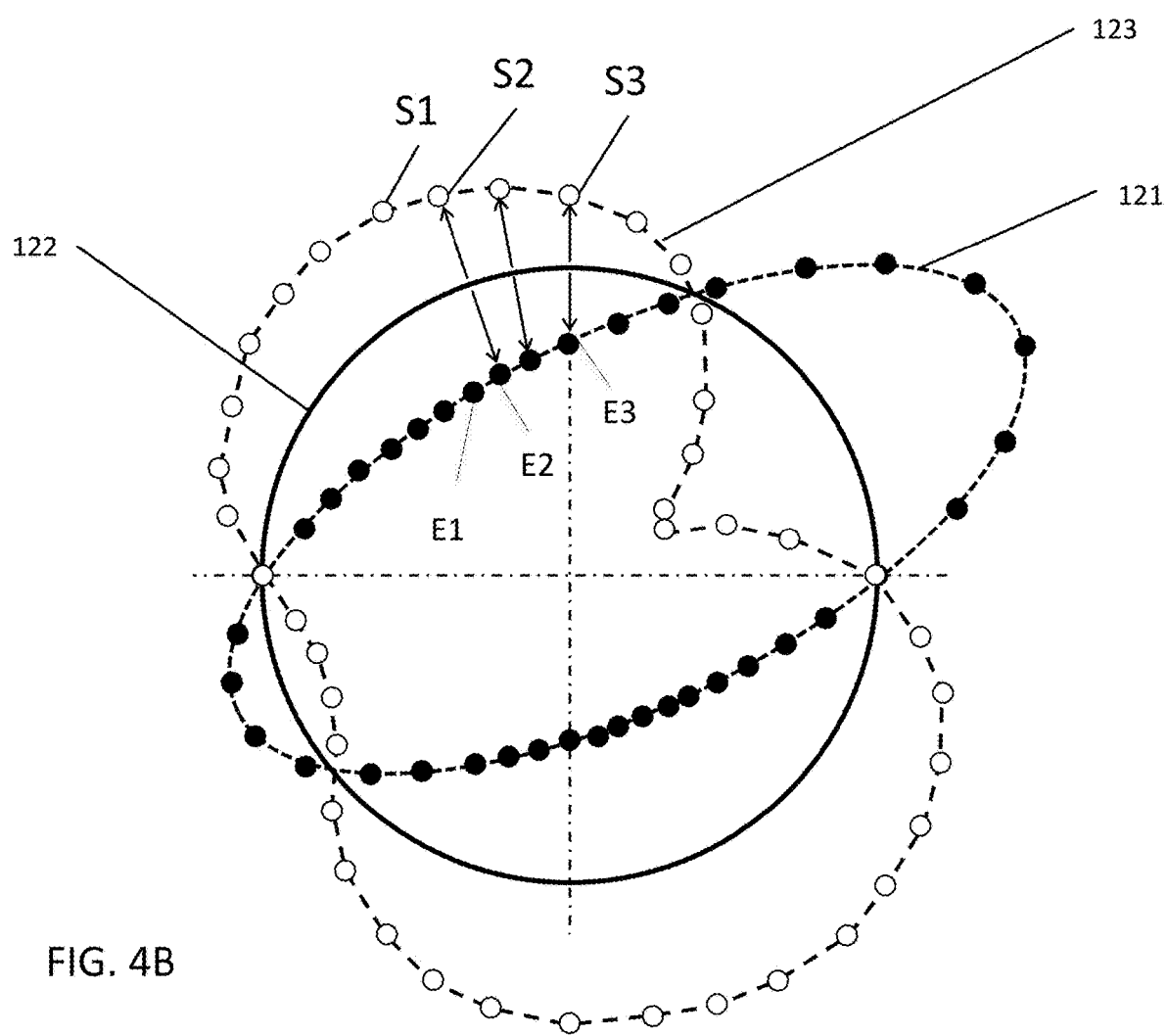
FIG. 4B illustrates an example comparison of an actual geometry, a desired geometry, and correction point template.

At step 118, the desired geometry of the workpiece may be used to determine the errors in the machined workpiece. For example, the measured geometry of the machined workpiece (e.g., from step 116) may be compared to the desired geometry of the workpiece in order to determine one or more errors. The total error is defined as the maximum deviation from one surface side of the machined workpiece, plus the maximum deviation from the other surface side of the machined workpiece. The error can be described as a profile or surface error as defined in ANSI standard Y14.5 and ISO standard 1101. Examples of geometry (e.g., otherwise referred to as form) error include straightness, roundness, cylindricity and surface profile. An example of roundness geometry error is illustrated in FIG. 4B, where the errors in the machined workpiece may be represented by the deviation between the desired geometry 122 (e.g., where the desired geometry is a circular hole in the workpiece) and the actual geometry 121 (e.g., where the actual geometry of the machined workpiece is an ellipse-type hole, as opposed to the desired circular hole).

At step 119, the correction point template 123 is created. The correction point template 123 may be created by mirroring the differences between the geometry of the desired workpiece and the geometry of the machined workpiece. For example, the differences may be mirrored along the desired geometry 122 to create the correction point template 123. The mirroring may be performed in any manner. As an example, the actual geometry 121 may consist of one or more error points (e.g., E1, E2, E3, . . . ) that deviate from the desired geometry 122. For each of these error points, a distance between the error point and a corresponding point on the desired geometry 122 may be calculated. For example, E3 may be displaced from a corresponding point on the desired geometry 122 by a distance along the Y-axis of negative 3 microns. To mirror this, the correction point template 123 may be created with correction points (S1, S2, S3, . . . ) that mirror the error points (E1, E2, E3, . . . ). For example, the correction point template 123 may be created with a correction point S3 that mirrors the error point E3 by being displaced in the opposite direction (e.g., via addition or subtraction) from the desired geometry 122. As an example of this, when error point E3 is displaced from a corresponding point on the desired geometry 122 by a distance along the Y-axis of negative 3 microns, correction point S3 may be created so as to be displaced from the same corresponding point on the desired geometry 122 by a distance along the Y-axis of positive 3 microns (i.e., the opposite of negative 3 microns). That is, the distance is inverted (from a negative 3 micron distance to a positive 3 micron distance) about the desired geometry 122, so that correction point S3 is displaced from the same corresponding point on the desired geometry 122 by the inverted distance (positive 3 micron distance). Thus, correction point S3 may "mirror" error point E3. By mirroring the errors along the desired geometry 122, a cloud of correction points (S1, S2, S3, . . . ) may be determined, thereby creating the correction point template 123. The mirroring may be applied to all three orthogonal axes (X, Y, Z) of the measured workpiece which correspond with the axes of the machine tool.

At step 120, a corrected toolpath trajectory is created, and the created corrected toolpath trajectory is utilized by the CNC 24 to machine a new workpiece 27 or to re-machine a previously machined workpiece. The corrected toolpath trajectory may be created in any manner.

As an example, the corrected toolpath trajectory may be created by modifying the NC file using the correction point template 123 (e.g., using the correction points (S1, S2, S3, . . . ) of the correction point template 123). This modification may change the NC file, which may be then be re-presented to the CNC 24. The CNC 24 may then interpret this modified NC file into new commands.

As another example, the corrected toolpath trajectory may be created by modifying linear and/or rotational axis servo commands during a servo cycle (as opposed to modifying the NC file). In such an example, the correction point template 123, which includes the correction points (S1, S2, S3, . . . ) may be utilized by the CNC 24 to modify the commands it creates. For example, the CNC 24 may superimpose the correction point template 123 with the commands it creates, in order to modify these commands (and thereby creating the corrected toolpath trajectory). As an example of this, the CNC 24 may once again interpret the instructions (e.g., the NC file from steps 110 and 112) in order to create commands. These commands may be (or include) a trajectory motion path calculation of the axes of the jig grinding machine 25, so as to create the desired workpiece, in some examples. As these commands are created, the commands may be modified based on the correction point template 123 to create the corrected toolpath trajectory. For example, the correction point template 123 may be superimposed on the commands, so as to modify the commands. As an example of this, and with regard to the error point E3 and correction point S3 discussed above, the created commands may result in a trajectory motion path that is a negative 3 microns away from the desired geometry along the Y-axis at that point. By superimposing the correction point template 123, the commands may be modified to a trajectory motion path that is a positive 3 microns away from the desired geometry along the Y-axis at that point (i.e., the opposite of negative 3 microns). To do so, the normal NC part program (e.g., CNC 24) generates a series of moves to command the jig grinding machine 25. The correction factors (e.g., from the correction point template 123) are then summed into the commanded trajectory at a point temporally after this normal trajectory generation, and just prior to the execution of the servo controller (e.g., servo processor). This change may counter the systematic error that caused the error in the machining process, resulting in a more accurate command. In some examples, modifying the commands at the CNC 24 (as opposed to modifying the NC file itself) may be preferable because it may better compensate for errors in the NC file and/or for errors in the interpretation of the NC file, in some examples.

Following the creation of the corrected toolpath trajectory, a new workpiece 27 may be machined by the jig grinding machine 25 utilizing corrected toolpath trajectory (e.g., utilizing the modifying the NC file, or utilizing the modified linear and/or rotational axis servo commands), or the previously machined workpiece may be re-machined by the jig grinding machine 25 utilizing the corrected toolpath trajectory. This may transform the new workpiece 27 (or the previously machined workpiece) into a new machined workpiece. Furthermore, due the error compensation process 100, the new machined workpiece may be more accurate, in some examples. For example, when the new machined workpiece is machined under the same conditions (as the previous machined workpiece) one or more (or all) of the deviations that are caused by the systematic errors may be corrected by the value amount of the correction point template respectively. As such, the new machined workpiece may have a geometry that deviates from the desired geometry by, for example, less than 2 micrometers, in some examples.

Figure 5:
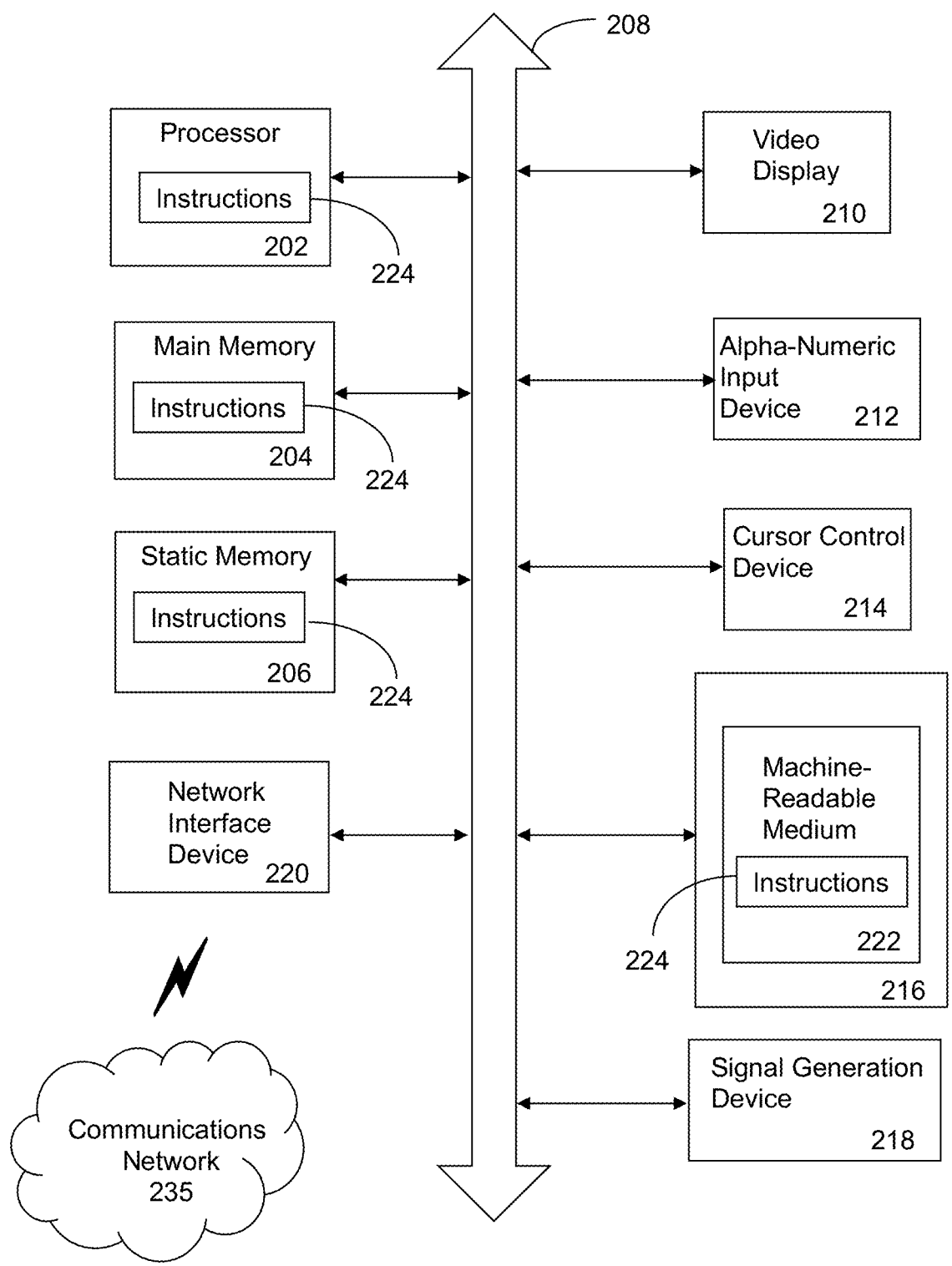
FIG. 5 illustrates a schematic diagram of an example computer system within which a set of instructions, when executed, may cause the computer system to perform any one or more of the methodologies or operations discussed herein.

FIG. 5 illustrates one example of computer system 200 that may perform one or more methods, actions, or steps associated with the CNC machine tool system 23, the error compensation method 100, or any combination of the preceding. For example, the computer system 200 may be one example of the CNC 24. As another example, the computer system 200 may be a device that determines the error in a machined workpiece geometry (e.g., steps 117-118 above) and/or creates a correction point template (e.g., step 119) for utilization by the CNC 24.

The computer system 200 may have a set of instructions that when executed, may cause the computer system 200 to perform any one or more of the methodologies or functions discussed above. In some embodiments, the computer system 200 may operate as a standalone device. In some embodiments, the computer system 200 may be connected (e.g., using communications network 235, another network, or a combination thereof) to and assist with operations performed by other machines and systems, such as, but not limited to, the CNC machine tool system 23, or any other device or system discussed herein (e.g., a coordinate measuring machine or a roundness gauge).

The computer system 200 may be connected with any component in the CNC machine tool system 23, or any other device or system discussed herein. In a networked deployment, the computer system 200 may operate in the capacity of a server or a client user machine in a server-client user network environment, or as a peer machine in a peer-to-peer (or distributed) network environment. The computer system 200 may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single computer system 200 is illustrated, the term "computer system" shall also be taken to include any collection of computer systems that individually or jointly execute a set (or multiple sets) of instructions to perform any one or more of the methodologies discussed herein.

The computer system 200 may include a processor 202 (e.g., a central processing unit (CPU), a graphics processing unit (GPU, or both), a main memory 204 and a static memory 206, which communicate with each other via a bus 208. The computer system 200 may further include a video display unit 210, which may be, but is not limited to, a liquid crystal display (LCD), a flat panel, a solid-state display, or a cathode ray tube (CRT). The computer system 200 may include an input device 212, such as, but not limited to, a keyboard, a cursor control device 214, such as, but not limited to, a mouse, a disk drive unit 216, a signal generation device 218, such as, but not limited to, a speaker or remote control, and a network interface device 220.

The disk drive unit 216 may include a machine-readable medium 222 on which is stored one or more sets of instructions 224, such as, but not limited to, software embodying any one or more of the methodologies or functions described herein, including those methods illustrated above. The instructions 224 may also reside, completely or at least partially, within the main memory 204, the static memory 206, or within the processor 202, or a combination thereof, during execution thereof by the computer system 200. The main memory 204 and the processor 202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, one or more of the methods or steps described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 222 containing instructions 224 so that a device connected to the communications network 235, another network, or a combination thereof, can send or receive voice, video or data, and communicate over the communications network 235, another network, or a combination thereof, using the instructions. The instructions 224 may further be transmitted or received over the communications network 235, another network, or a combination thereof, via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification.

The invention claimed is:

1. An error compensation method for a Computer Numerical Controller (CNC) machine tool system, the CNC machine tool system including a CNC machine tool having (a) two or more linear machine axes or (b) two or more linear machine axes and one or more rotational machine axes, the CNC machine tool further including a spindle configured to hold a rotary tool having at least one cutting edge for removing the material from the workpiece, the CNC machine tool system further including one or more processors, the error compensation method comprising:

receiving, with the CNC machine tool system, instructions for a workpiece;

interpreting, with the CNC machine tool system, the received instructions to translate the received instructions into linear and/or rotational axis servo commands for a toolpath trajectory;

removing, with the CNC machine tool system, material from the workpiece using the linear and/or rotational axis servo commands for the toolpath trajectory to create a first machined workpiece;

measuring, with the CNC machine tool system, the first machined workpiece for geometric accuracy in comparison to a desired geometry to determine one or more errors;

mirroring, with the CNC machine tool system, the one or more errors with respect to the desired geometry to create a correction point template;

superimposing, with the CNC machine tool system, the plurality of correction points onto the linear and/or rotational axis servo commands to modify the linear and/or rotational axis servo commands to create a corrected toolpath trajectory temporally after normal trajectory generation and prior to execution of the linear and/or rotational axis servo commands; and removing, with the CNC machine tool system, material from the first machined workpiece or a second workpiece using the modified linear and/or rotational axis servo commands for the corrected toolpath trajectory to create a second machined workpiece with an improved geometry accuracy of better than 2 micrometers in comparison to the desired geometry.

2. The method of claim 1, wherein the rotary tool is a grinding wheel, a milling tool, or a boring tool.

3. The method of claim 1, wherein the one or more processors are internal to the CNC machine tool.

4. The method of claim 1, wherein the one or more processors are external from the CNC machine tool.

5. The method of claim 1, wherein the corrected tool path trajectory is created in a machine code format that is compatible with the one or more processors.

6. The method of claim 1, wherein the first machined workpiece is measured for geometric accuracy by a metrology device of the CNC machine tool system while the first machined workpiece is positioned on the same CNC machine tool that removed the material.

7. The method of claim 6, wherein the metrology device is a mechanical contacting probe, a non-contacting scanner, or a non-contacting probe.

8. The method of claim 1, wherein the first machined workpiece is measured for geometric accuracy on a metrology device of the CNC machine tool system that is independent of the CNC machine tool.

9. The method of claim 8, wherein the metrology device is a coordinate measuring machine, a roundness gauge, a cylindricity gauge, or a bore gauge.

10. An error compensation method for a Computer Numerical Controller (CNC) machine tool system, the CNC machine tool system including a CNC machine tool having (a) two or more linear machine axes or (b) two or more linear machine axes and one or more rotational machine axes, the CNC machine tool further including a spindle configured to hold a rotary tool having at least one cutting edge for removing the material from the workpiece such that at least one of the linear axes reciprocates while the other axes are utilized to traverse a contour on the workpiece, the CNC machine tool system further including one or more processors, the error compensation method comprising:

receiving, with the CNC machine tool system, instructions for a workpiece;

interpreting, with the CNC machine tool system, the received instructions to translate the received instructions into linear and/or rotational axis servo commands for a toolpath trajectory;

removing, with the CNC machine tool system, material from the workpiece using the linear and/or rotational axis servo commands for the toolpath trajectory to create a first machined workpiece;

measuring, with the CNC machine tool system, the first machined workpiece for geometric accuracy in comparison to a desired geometry to determine one or more errors;

mirroring, with the CNC machine tool system, the one or more errors with respect to the desired geometry to create a correction point template;

superimposing, with the CNC machine tool system, the plurality of correction points onto the linear and/or rotational axis servo commands to modify the linear and/or rotational axis servo commands to create a corrected toolpath trajectory temporally after normal trajectory generation and prior to execution of the linear and/or rotational axis servo commands; and removing, with the CNC machine tool system, material from the first machined workpiece or a second workpiece using the modified linear and/or rotational axis servo commands for the corrected toolpath trajectory to create a second machined workpiece with an improved geometry accuracy in comparison to the desired geometry.

11. The method of claim 10, wherein the rotary tool is a grinding wheel, a milling tool, or a boring tool.

12. The method of claim 10, wherein the one or more processors are internal to the CNC machine tool.

13. The method of claim 10, wherein the one or more processors are external from the CNC machine tool.

14. The method of claim 10, wherein the corrected tool path trajectory is created in a machine code format that is compatible with the one or more processors.

15. The method of claim 10, wherein the first machined workpiece is measured for geometric accuracy by a metrology device of the CNC machine tool system while the first machined workpiece is positioned on the same CNC machine tool that removed the material.

16. The method of claim 15, wherein the metrology device is a mechanical contacting probe, a non-contacting scanner, or a non-contacting probe.

17. The method of claim 10, wherein the first machined workpiece is measured for geometric accuracy on a metrology device of the CNC machine tool system that is independent of the CNC machine tool.

18. The method of claim 17, wherein the metrology device is a coordinate measuring machine, a roundness gauge, a cylindricity gauge, or a bore gauge.

19. A Computer Numerical Controller (CNC) machine tool system, comprising:

a CNC machine tool comprising:
(a) two or more linear machine axes or (b) two or more linear machine axes and one or more rotational machine axes; and
a spindle configured to hold a rotary tool having at least one cutting edge for removing material from a workpiece; and one or more processors configured to:
receive instructions for a workpiece;
interpret the received instructions to translate the received instructions into linear and/or rotational axis servo commands for a toolpath trajectory;
utilize the linear and/or rotational axis servo commands for the tool path trajectory to cause the CNC machine tool to remove material from the workpiece to create a first machined workpiece;
receive one or more errors in the first machined workpiece in comparison to a desired geometry;
mirror the one or more errors with respect to the desired geometry to create a correction point template;
superimpose the plurality of correction points onto the linear and/or rotational axis servo commands to modify the linear and/or rotational axis servo commands to create a corrected toolpath trajectory temporally after normal trajectory generation and prior to execution of the linear and/or rotational axis servo commands; and
utilize the modified linear and/or rotational axis servo commands for the corrected toolpath trajectory to cause the CNC machine tool to remove material from the workpiece or a second workpiece to create a second machined workpiece with an improved geometry accuracy of better than 2 micrometers in comparison to the desired geometry.

20. The system of claim 19, wherein the rotary tool is a grinding wheel, a milling tool, or a boring tool.

21. The system of claim 19, wherein at least one of the one or more processors is an internal processor of the CNC machine tool.

22. The system of claim 19, wherein at least one of the one or more processors is external from the CNC machine tool.

23. The system of claim 19, wherein the corrected tool path trajectory is created in a machine code format that is compatible with the one or more processors.

24. The system of claim 19, further comprising a metrology device configured to measure the first machined workpiece for geometric accuracy in comparison to a desired geometry to determine the one or more errors to create the correction point template, while the first machined workpiece is positioned on the same CNC machine tool that removed the material.

25. The system of claim 24, wherein the metrology device is a mechanical contacting probe, a non-contacting scanner, or a non-contacting probe.

26. The system of claim 19, further comprising a metrology device configured to measure the first machined workpiece for geometric accuracy in comparison to a desired geometry to determine the one or more errors to create the correction point template, wherein the metrology device is connected to the CNC machine tool such that the first machined workpiece can be exchanged between the CNC machine tool and the metrology device by automation.

27. The system of claim 26, wherein the metrology device is a coordinate measuring machine, a roundness gauge, a cylindricity gauge, or a bore gauge.

28. A Computer Numerical Controller (CNC) machine tool system, comprising:

a CNC machine tool comprising:
(a) two or more linear machine axes or (b) two or more linear machine axes and one or more rotational machine axes; and
a spindle configured to hold a rotary tool having at least one cutting edge for removing material from a workpiece, wherein the CNC machine tool is configured to reciprocate at least one of the linear machine axes while the other axes are utilized to traverse a contour on the workpiece; and one or more processors configured to:
- receive instructions for a workpiece;
- interpret the received instructions to translate the received instructions into linear and/or rotational axis servo commands for a toolpath trajectory;
- utilize the linear and/or rotational axis servo commands for the tool path trajectory to cause the CNC machine tool to remove material from the workpiece to create a first machined workpiece;
- receive one or more errors in the first machined workpiece in comparison to a desired geometry;
- mirror the one or more errors with respect to the desired geometry to create a correction point template;
- superimpose the plurality of correction points onto the linear and/or rotational axis servo commands to modify the linear and/or rotational axis servo commands to create a corrected toolpath trajectory temporally after normal trajectory generation and prior to execution of the linear and/or rotational axis servo commands; and
- utilize the modified linear and/or rotational axis servo commands for the corrected toolpath trajectory to cause the CNC machine tool to remove material from the workpiece or a second workpiece to create a second machined workpiece with an improved geometry accuracy of better than 2 micrometers in comparison to the desired geometry.

29. The system of claim 28, wherein the rotary tool is a grinding wheel, a milling tool, or a boring tool.

30. The system of claim 28, wherein at least one of the one or more processors is an internal processor of the CNC machine tool.

31. The system of claim 28, wherein at least one of the one or more processors is external from the CNC machine tool.

32. The system of claim 28, wherein the corrected tool path trajectory is created in a machine code format that is compatible with the one or more processors.

33. The system of claim 28, further comprising a metrology device configured to measure the first machined workpiece for geometric accuracy in comparison to a desired geometry to determine the one or more errors to create the correction point template, while the first machined workpiece is positioned on the same CNC machine tool that removed the material.

34. The system of claim 33, wherein the metrology device is a mechanical contacting probe, a non-contacting scanner, or a non-contacting probe.

35. The system of claim 28, further comprising a metrology device configured to measure the first machined workpiece for geometric accuracy in comparison to a desired geometry to determine the one or more errors to create the correction point template, wherein the metrology device is connected to the CNC machine tool such that the first machined workpiece can be exchanged between the CNC machine tool and the metrology device by automation.

36. The system of claim 35, wherein the metrology device is a coordinate measuring machine, a roundness gauge, a cylindricity gauge, or a bore gauge.

* * * * *